Figures 1, 2:
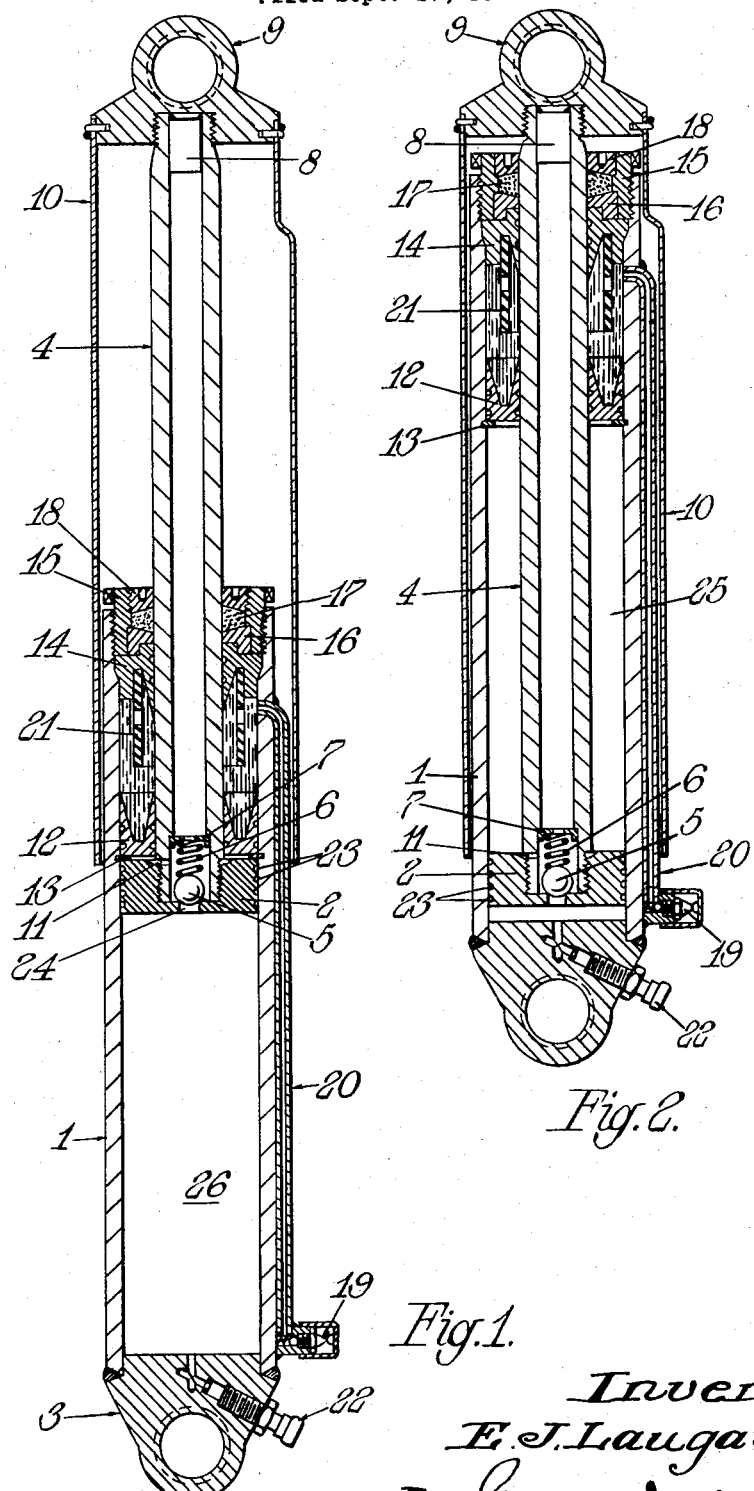

March 6, 1956 E. J. LAUGAUDIN 2,737,384
PNEUMATIC SHOCK ABSORBER
Filed Sept. 17, 1951

Inventor
E. J. Laugaudin

United States Patent Office 2,737,384
Patented Mar. 6, 1956

2,737,384

PNEUMATIC SHOCK ABSORBER

Eugène Jules Laugaudin, Toulouse, France; Marie Antoinette Milhau Laugaudin and Maryse Cecile Paulette Laugaudin Sallet, heirs of said Eugène Jules Laugaudin, deceased Application September 17, 1951, Serial No. 246,906

Claims priority, application France September 22, 1950

3 Claims. (Cl. 267—65)

The present invention relates to a pneumatic shock absorber with pneumatically restrained relaxation, for all industrial purposes, for instance for use in automobiles, aircraft, railways and the like.

This shock absorber consists of a cylinder closed at one of its ends and provided with a piston controlled by a rod, the bottom of the cylinder being pivotally connected to one point of support and the end of the piston to another, and the other end of the cylinder being closed by means of a closure member having an air-tight sealing gland for the piston rod. Air under pressure is stored in the cylinder between the bottom thereof and the piston. Under the action of shocks, an abrupt displacement of the piston within the cylinder takes place, which is proportional to the force of the shock, the compressed air, now occupying only the smaller space existing between the bottom of the cylinder and the piston, is forced through a non-return valve of a small section this compressed air goes through the piston and expanding on the other side of the piston passes into the space then formed between the piston and the cylinder and closure member.

During the relaxation which follows the cessation of the force created by the shock and is due to the difference between the pressures on the two sides of the piston, the piston returns to its initial position in a retarded manner because the air which has passed through the valve during the shock returns slowly past the piston in the opposite direction, preferably through grooves made for this purpose in the periphery of the piston; the expansion is therefore retarded pneumatically.

The air-tight sealing gland disposed below the end closure member is a hydraulic joint employing oil or some greasy liquid and consisting of two opposed annular plugs one stationary and the other movable, made of metal or any other suitable material with scraper edges, the movable ring being constantly urged towards the stationary ring by the pressure of the air contained in the cylinder, and therefore transmitting this pressure to the oil which thus ensures air-tightness round the piston rod.

One embodiment of this shock-absorber is illustrated by way of example in the accompanying drawings, in which:

Figure 1 shows the shock absorber in longitudinal section, in the expanded position, and Figure 2 is a similar view to Figure 1, but shows the position of compression under the action of a shock.

The apparatus comprises a cylinder 1 closed at one end by a plug 3 which is pivotally connected to a point of support and carries a valve 22 for introducing compressed air into the cylinder. Under the action of shocks a piston 2 is displaced in the cylinder, this piston being mounted at the end of a rod 4 which is preferably hollow but which may be a solid rod of any suitable diameter, and which is closed at 8 in its upper part and in this same part carries a member 9 pivotally mounted on another point of support.

The piston 2 is provided on its periphery with grooves 23 and in its central part with an opening 24 against which a ball 5 is pressed by a spring 6 of suitable strength, one end of said spring bearing against the ball and the other end against a supported ring 7 accommodated in the hollow rod 4. This device may be replaced by a valve of any other suitable type. A duct 11 of small cross-sectional area provides communication between the inside of the hollow rod 4 and the space 25 between this hollow rod and the inside of the cylinder 1.

The upper part of the cylinder 1 is closed by a hydraulic sealing gland described hereinafter.

It consists of two annular plug members 12 and 14, with flexible scraper edges, made of metal or any other suitable material, which plugs bear against the inner wall of the cylinder 1 and the outer wall of the rod 4. The annular plug 12 is movable, its displacement in the cylinder being limited by an abutment segment 13 rigid with the said cylinder. It is provided with two scraper edges, of which one bears against the inner wall of the cylinder and the other against the outer wall of the hollow rod. The annular plug 14 is stationary and rests against a shoulder provided in the upper part of the cylinder 1. This plug has only one scraper edge, which bears against the outer wall of the hollow rod 4.

Between these two plugs there is disposed an abutment 21 (which may be replaced by a helical spring) for limiting the displacement of the plug 12.

A greasy liquid, for instance oil, is injected into the space between the two plugs and the cylinder 1 through the valve closure 19 and the duct 20.

The annular plug 14 is held in place on the end of the cylinder 1 by a bush 15 screwed, or fixed in any suitable manner, to the end of the cylinder. This bush, which comprises a central opening for the passage of the rod 4, is provided internally with a stuffing-box 16—17—18 to prevent the entry of foreign matter into the apparatus.

The apparatus is completed by a cover 10, sliding on the outside of the cylinder 1, which also contributes to the protection of the rod 4 from dust or mud-splashes.

To set this apparatus in operation, oil is injected under pressure through the valve closure 19 and the duct 20 into the space enclosed between the two annular plug members 12 and 14 so as to fill this space completely; when this is done, the movable plug 12 is pushed away until it comes into contact with the abutment segment 13 which limits its displacement.

On the other hand, air is introduced into the cylinder 1 through the valve 22 and passes into the space 26 until this air reaches the required pressure. The apparatus is then in the position illustrated in Figure 1.

The apparatus is placed between any two suitable points of support and is preferably pivotally attached to these points, one of the points being stationary and the other movable (or both being movable); assuming that the movable point of support is attached to the plug 3, when a shock occurs the cylinder 1 is displaced in relation to the piston 2 which remains stationary, being connected to the stationary point of support by the rod 4; the compressed air contained in the cylinder is further compressed, raises the ball 5, passes into the hollow rod 4 and, through the duct 11, enters the space 25 which then exists between the hollow rod 4 and the cylinder 1.

The apparatus is then in the position shown in Figure 2 which illustrates the maximum displacement of the cylinder in relation to the piston; the volume of the space 25 will obviously vary according to the force of the shocks.

The pressure of the air in the space 25 acts directly on the bottom of the movable annular plug member 12 and urges this ring towards the stationary annular plug member 14, but the movable plug member 12 transmits the pressure which it receives to the greasy liquid trapped between the two plug members, so that an absolutely airtight hydraulic joint is thus formed and prevents any escape of air from the cylinder.

The large number of shocks transmitted to the apparatus, more especially when it is used in motor vehicles, will cause very slight losses of oil to occur; this in no way impairs the efficiency of the hydraulic joint, since the pressure of the air in the cylinder always urges the movable annular plug member towards the stationary annular plug member and consequently the oil is subjected to this pressure and ensures the requisite sealing action. The object of the abutment 21 is to limit the displacement of the movable annular plug member 12 in order to prevent damage to its thin edges which might occur if it came into contact with the stationary plug member 14.

In the expansion movement which follows the cessation of the shock the apparatus returns to the initial position, mainly by reason of the difference in the pressures existing on the two sides of the piston, but the air contained in the space 25 returns into the space 26 in a retarded manner, through the grooves 23 provided in the periphery of the piston, which furthermore is not fitted into the piston absolutely tightly. The expansion movement is therefore braked pneumatically.

This apparatus, of which the embodiment illustrated is only one constructional example which may be modified in its details, constitutes a device for absorbing shocks by means of air which is initially at a given pressure and which is further compressed under the effect of the shocks and proportionally to the force of these shocks; the return to the starting position is effected only gradually, the expansion movement being braked by that part of the air in the apparatus which is at a pressure lower than that determined by the shock.

Finally, it should be noted that with a cylinder of given volume and a given initial air pressure, the shock-absorbing power and the braking of the expansion movement may be varied by varying the loading of the piston valve, the diameter of the duct 11, or the diameter of the solid or hollow rod controlling the piston.

I claim:

1. A pneumatic shock absorber for interposition between two relatively movable elements, of the kind comprising an air cylinder having a closed end with means thereon for connecting it to one of the relatively movable elements, a piston reciprocable in said cylinder, a piston rod connected to said piston and arranged to pass through the other end of said cylinder, said piston having means thereon outside the cylinder for connecting it to the other element, an air transfer duct in said piston rod, and a non-return valve arranged to permit the flow of air through said transfer duct only while the piston is moving towards the closed end of the cylinder, which further comprises a hydraulic sealing gland at said other end of the cylinder, adapted to prevent the escape of air past the piston rod, said gland having a duct for the admission of liquid and a valve adapted to close the duct and thereby prevent the escape of liquid from the gland, and which also comprises a valve in said closed end of the cylinder adapted to admit compressed air into the cylinder, the piston being formed with peripheral throttling ridges, which do not fit absolutely tightly in the cylinder, for establishing restricted open communication between the two sides of the piston to retard the return of the piston to its initial position.

2. A pneumatic shock absorber as claimed in claim 1, in which the hydraulic sealing gland comprises a stationary annular plug member in the cylinder having an inwardly directed flexible scraper edge engaging around the piston rod, a second plug member in the cylinder spaced from said stationary plug member and having a flexible scraper edge engaging around the piston rod, a sealing liquid between said plug members, said second plug member being movable in the cylinder so as to enable the pressure produced in the cylinder on the side of the piston facing the movable plug member to act on the latter and place the sealing liquid under pressure so as to apply the flexible scraper edges to the piston rod, a tubular member having an external diameter substantially smaller than the internal diameter of the cylinder and adapted to limit the movement of the movable plug member towards the stationary one, and a flat ring engaging in an annular slot in the cylinder and adapted to limit the movement of the movable plug member away from the stationary one.

3. A pneumatic shock absorber as claimed in claim 1, in which a stuffing box is provided on the side of the hydraulic sealing gland remote from the piston, to prevent the entry of foreign matter into the cylinder.

References Cited in the file of this patent

UNITED STATES PATENTS

| 1,050,571 | Smith | Jan. 14, 1913 |
| 1,563,169 | Daniel et al. | Nov. 24, 1925 |
| 1,779,938 | Joyce | Oct. 28, 1930 |
| 1,860,756 | Waninger | May 31, 1932 |
| 1,866,167 | Lolley | July 5, 1932 |
| 1,958,489 | Moulton | May 15, 1934 |
| 1,973,323 | Adams | Sept. 11, 1934 |
| 2,111,792 | Laugaudin | Mar. 22, 1938 |

FOREIGN PATENTS

| 469,473 | Great Britain | July 23, 1937 |